Feb. 15, 1966   L. SPENCER   3,234,696
EXPANSIBLE TRAILER
Filed Jan. 17, 1961   5 Sheets-Sheet 1

INVENTOR.
LLOYD SPENCER
BY Lyon & Lyon
ATTORNEYS

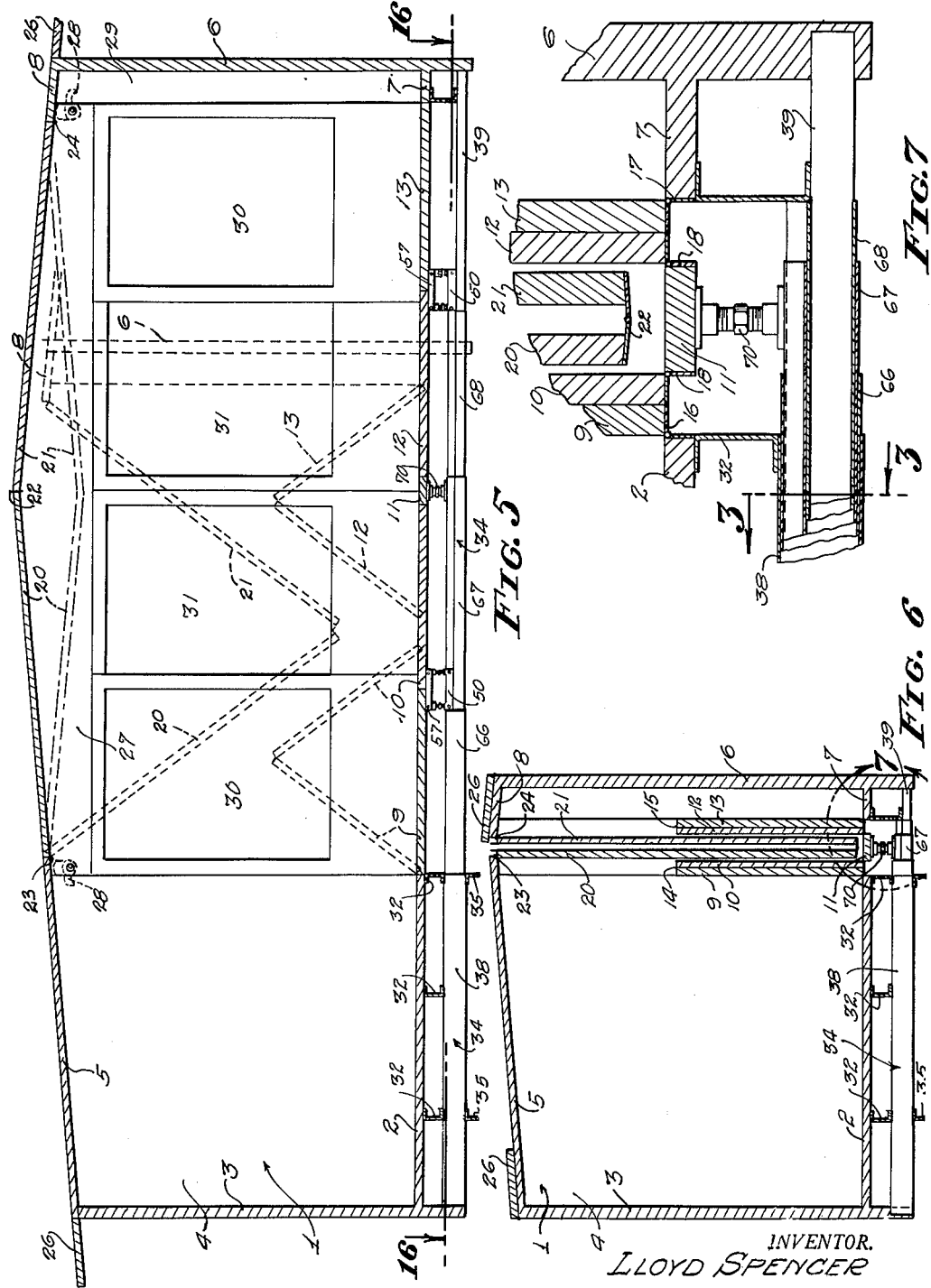

Feb. 15, 1966   L. SPENCER   3,234,696
EXPANSIBLE TRAILER
Filed Jan. 17, 1961   5 Sheets-Sheet 3
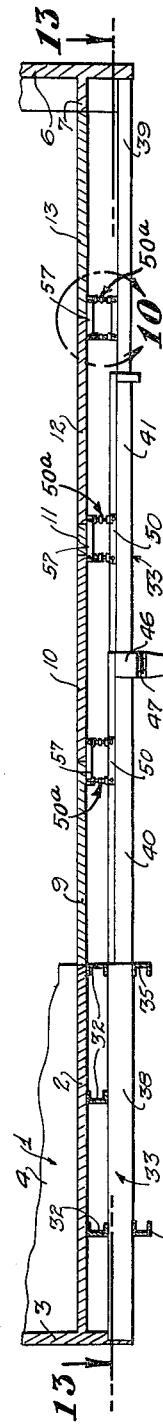
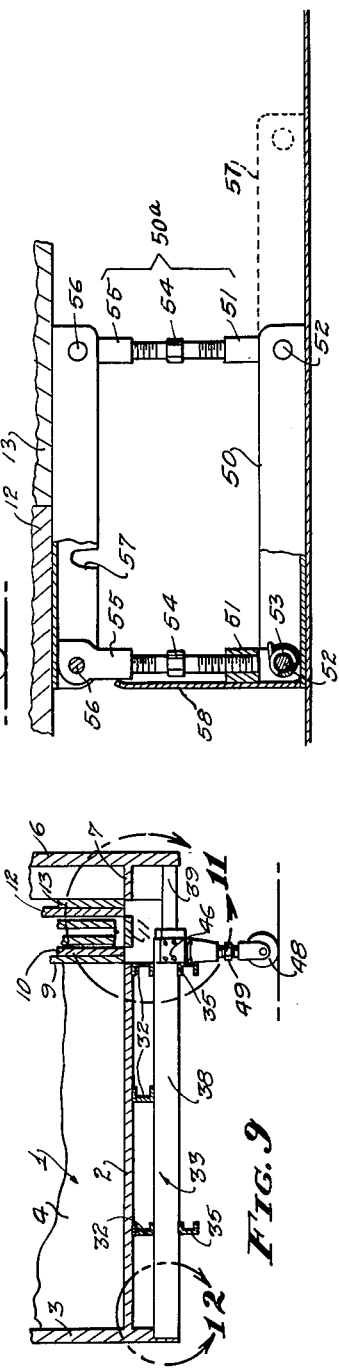
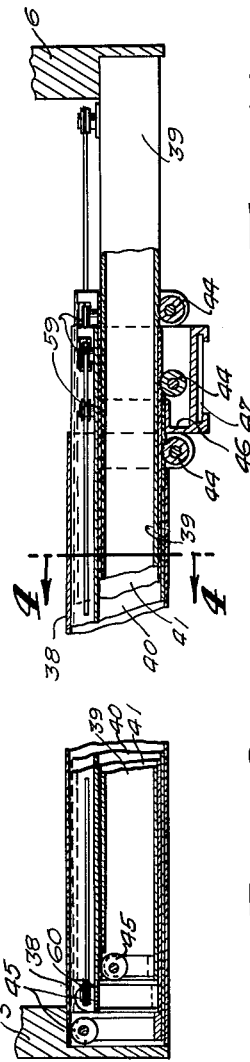
INVENTOR.
LLOYD SPENCER
BY
*Lyon & Lyon*
ATTORNEYS

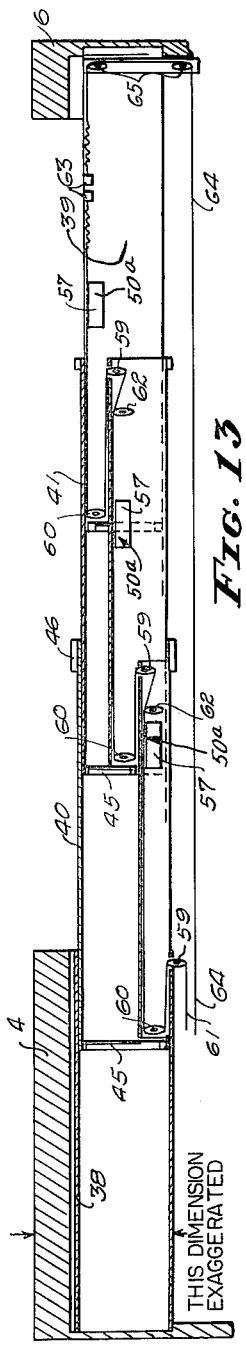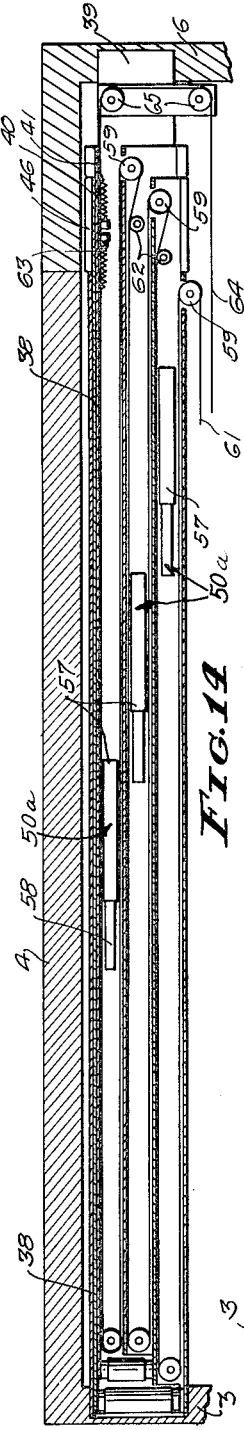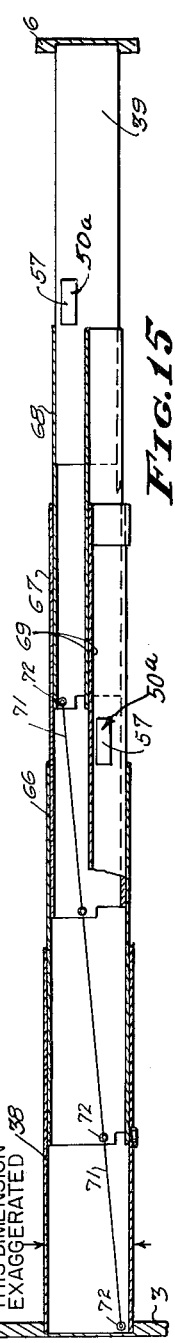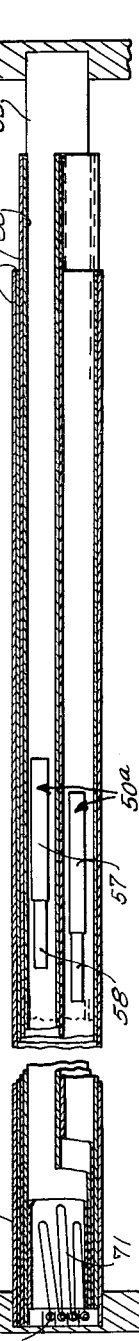

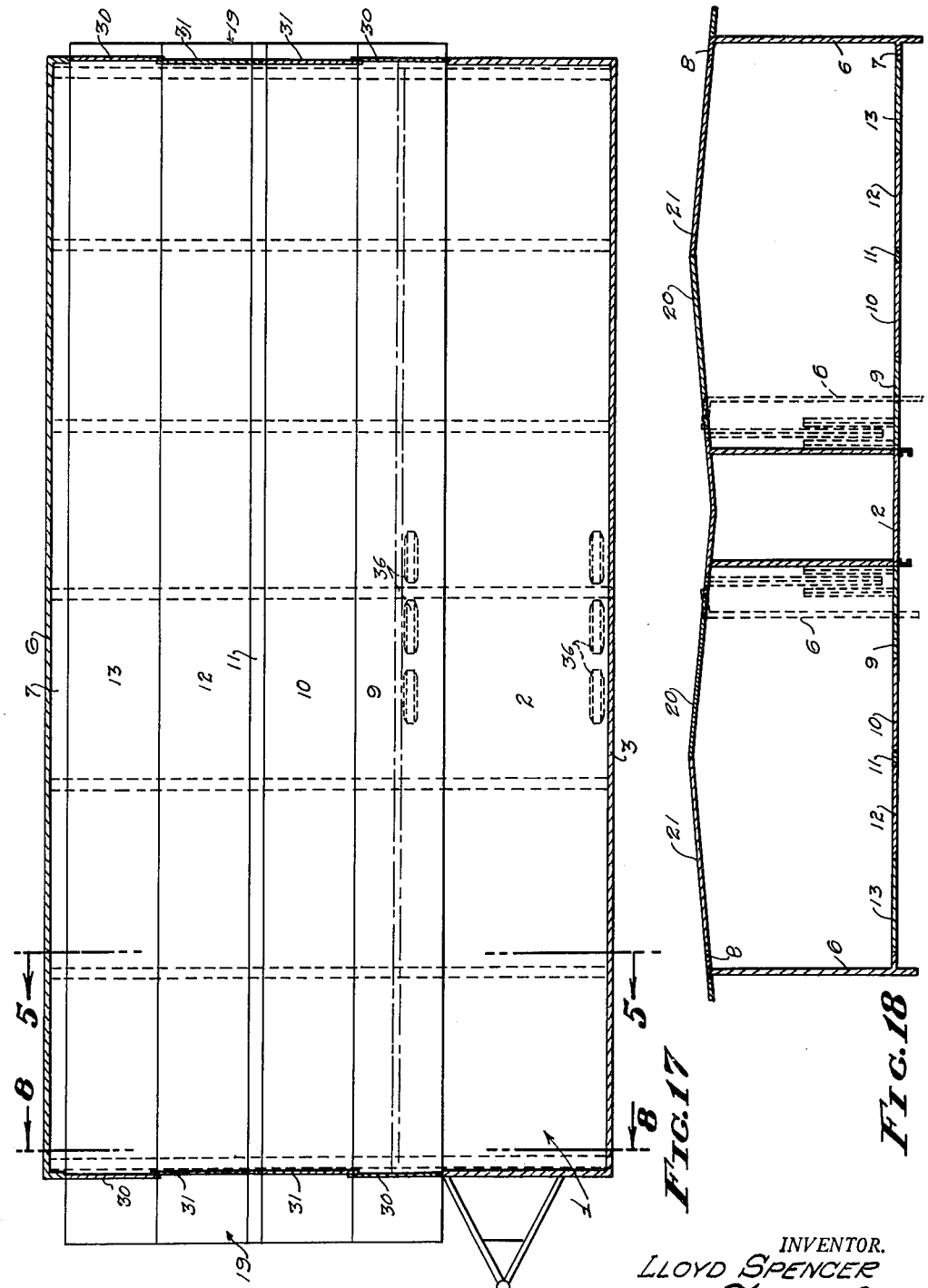

United States Patent Office 3,234,696
Patented Feb. 15, 1966

3,234,696
EXPANSIBLE TRAILER
Lloyd Spencer, Los Angeles, Calif., assignor, by mesne assignments, to Trailorama, Inc., Gardena, Calif., a corporation of California
Filed Jan. 17, 1961, Ser. No. 83,320
14 Claims. (Cl. 52—66)

This invention relates to expansible trailers, and included in the objects of this invention are:

First, to provide an expansible trailer which is particularly intended for use as a mobile home, office, school unit, factory unit, or the like, in that the trailer may be expanded more than twice its retracted width, even to four times its retracted width, so as to provide floor areas which heretofore have not been feasible in trailer construction.

Second, to provide an expansible trailer wherein the expansible portion or portions occupy a minimum part of the fixed portion of the trailer so that plumbing, heating, and air conditioning units may be permanently arranged in the fixed section.

Third, to provide an expansible trailer wherein expansion and contraction is effected by roof panels which fold to the floor and floor panels which fold upwardly overlapping the sides of the roof panels, the panels being so interrelated that although they nestle closely when the trailer is retracted, move to and from their extended positions without interference.

Fourth, to provide an expansible trailer utilizing folding roof and floor panels wherein these panels project beyond the ends of the trailer to form eaves and porch or entrance platforms respectively, and by reason of the fact that the panels project beyond the ends of the trailer simplify the problem of sealing the interior of the trailer.

Fifth, to provide an expansible trailer which incorporates novel expansible joists having floor supporting structures which automatically raise into floor supporting position as the trailer expands and automatically fold as the trailer contracts, the expansible joists also being arranged to function as ducts for heating or air conditioning, or conduits for electrical cables extending between the fixed portion of the trailer and the extended wall thereof.

Sixth, to provide an expansible trailer which is related to the expansible trailer constructions shown in Patent No. 2,898,143, issued August 4, 1959, to John Ferrera entitled "Extensible Trailer," Patent No. 2,898,144, issued August 4, 1959, to John Ferrera entitled, "Floor Supporting Means for Expansible Trailers," and Patent No. 2,902,-312, issued September 1, 1959, to John Ferrera entitled, "Expansible House Trailer."

With the above and other objects in view, as may appear hereinafter, reference is directed to the accompanying drawings in which:

FIGURE 5 is a transverse, sectional view of the trailer taken through 5—5 of FIGURE 17 showing by solid lines its extended condition and indicating by dash and broken lines the intermediate positions thereof;

FIGURE 6 is a transverse, sectional view taken in the same plane as FIGURE 5 showing the trailer in its retracted position;

FIGURE 7 is an enlarged, fragmentary, sectional view taken within circle 7 of FIGURE 6;

FIGURE 8 is a fragmentary, transverse, sectional view of the trailer in its extended condition taken through 8—8 of FIGURE 17, showing the floor and end joist constructions;

FIGURE 9 is a fragmentary, transverse, sectional view taken in the same plane as FIGURE 8 showing the trailer in its retracted position;

FIGURE 10 is an enlarged, fragmentary, sectional view taken within circle 10 of FIGURE 8;

FIGURE 11 is an enlarged, fragmentary, sectional view taken within circle 11 of FIGURE 9;

FIGURE 12 is an enlarged, fragmentary, sectional view taken within circle 12 of FIGURE 9;

FIGURE 13 is a fragmentary, sectional view showing an end joist structure taken through 13—13 of FIGURE 8 with the transverse dimension exaggerated; that is, with the length of the joist foreshortened with respect to its width to aid in illustrating its construction;

FIGURE 14 is a fragmentary, sectional view of an end joist structure taken in the same plane as FIGURE 13, but showing the joist structure retracted and with its longitudinal and transverse dimensions being similar in scale;

FIGURE 15 is a fragmentary, sectional view of an intermediate joist structure taken through 15—15 of FIGURE 5, with the transverse dimension exaggerated; that is, the transverse scale being greater than the longitudinal scale;

FIGURE 16 is a fragmentary, sectional view of an intermediate joist structure taken in the same plane as FIGURE 15 but showing the joist structure in its retracted condition, and with its longitudinal and transverse dimensions being similar in scale;

FIGURE 17 is a sectional view of the trailer in its expanded condition, the section being taken in a plane parallel with the floor;

FIGURE 18 is a substantially diagrammatical transverse, sectional view corresponding to FIGURE 5, showing a modified form of trailer in which the two opposite sides expand.

Figure 1:
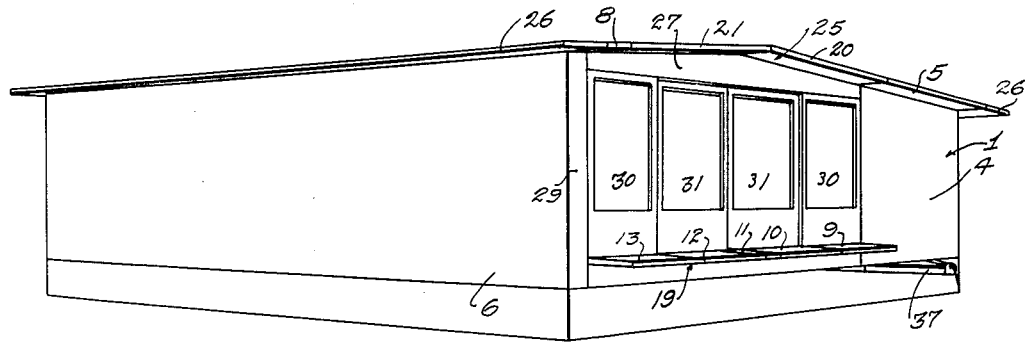
FIGURE 1 is a perspective view of one form of the expansible trailer shown in its expanded condition.

The trailer includes a fixed section 1 having a fixed floor 2, side wall 3, end walls 4, and a fixed roof 5; that is, the fixed section is provided with one open side. Windows, doors, and the like, not shown, are arranged in any suitable manner in the walls. Also, the fixed section may be divided in any desired manner into compartments or rooms. For the reason that it is fixed, section 1 lends itself to use for those rooms or compartments requiring plumbing, appliances, or control devices, which require plumbing, electrical connections, or fluid ducts.

A movable side wall 6 closes the remaining side of the trailer. A narrow marginal floor strip 7 and roof strip 8 are secured to the movable wall. Interposed between the fixed floor 2 and marginal floor strip 7 are a first pair of upwardly folding floor panels 9 and 10, a central floor strip 11, and a second pair of upwardly folding floor panels 12 and 13. The respective pairs of floor panels are joined together by hinges 14 and 15. The distal edges of the floor panels 9 and 13 are joined by hinges 16 and 17 to the fixed floor 2 and marginal floor strip 7.

The proximal edges of the floor panels 10 and 12 are joined to the central floor strip 11 by hinges 18. When the two pairs of floor panels are folded upwardly, they are separated from each other by an amount equal to the width of the central floor strip 11, and the floor panel 13 is separated from the movable wall 6. The floor panels and central floor strip 11 project beyond at least one end of the fixed section to form, when the trailer is extended, a platform or porch 19.

A pair of foldable roof panels 20 and 21 is interposed between the fixed roof 5 and the marginal roof strip 8. The roof panels are joined together by hinges 22. The roof panels 20 are joined by a hinge 23 to the fixed roof 5, and the roof panel 21 is joined to the marginal roof strip 8 by a hinge 24.

The width of each roof panel 20 and 21 is slightly less than the vertical distance between the fixed roof 5 or the marginal roof strip 8 and the floor. The locations of the hinges 23 and 24 are such that when the trailer is in its contracted position the roof panels 20 and 21 hang downwardly in contiguous relation with each other between the two pairs of floor panels, as shown in FIGURE 6.

The ends of the roof panels 20 and 21 project beyond the ends of the fixed trailer section to form eaves 25. The fixed roof 5 also extends beyond the end walls 4 so as to form eaves continuing from the eaves 25. In addition the side wall 3 and the movable side wall 6 are provided with eaves 26.

It is preferred that the fixed roof 5 slope upwardly from the side wall 3 toward its margin which is joined to the roof panel 20. The marginal roof strip 8 is provided with a similar slope. The roof panels 20 and 21 are adapted, when the trailer is in its expanded condition, to be forced upwardly until the hinge connection 22 is above the level of the hinge connections 23 and 24 so that the roof panels form a peaked roof.

The roof panels 20 and 21 are held in their upwardly sloping condition by removable beams 27 having suitable latch means 28 at their extremities, which connect the ends of the beams 27 with the end walls 4 and with the movable side wall 6, or preferably with end wall strips 29 provided at the extremities of the movable end wall 6.

The space under each of the beams 27 receives fixed door units 30 and sliding door units 31, or if desired fixed wall panels may be substituted. The door or wall panels are removable and may, when the trailer is folded, be stored in the space above the marginal floor strip 7.

The floor 2 of the fixed trailer section is supported on longitudinal joists 32 which in turn are supported at their ends on transverse joist structures 33 and between their ends on medial transverse joist structures 34. The joist structures in turn are supported on a subframe 35 having wheels 36. A trailer hitch 37 is provided at one end of the subframe.

Each of the joist structures 33 and 34 include fixed or major joist tubes 38 secured to the subframe 35, an longitudinal joists 32 and minor joist tubes 39 secured to the lower extremity of the movable side wall 6, below the marginal floor strip 7.

The major and minor joist tubes 38 and 39 are rectangular in cross section. The minor joist tubes telescope within the major joist tubes, and their vertical dimensions are substantially less than the major joist tubes 38 so as to define a lower compartment within the minor joist tubes, and an upper compartment between the minor joist tubes and the major joist tubes.

The end joist structures 33 are provided with two intermediate joist tubes 40 and 41 adapted to be interposed between the major and minor joist tubes. Within the upper compartment formed by the major and minor joist tubes the intermediate joist tubes are provided with re-entrant corners 42 and 43 which forms upwardly facing walls 42a and 43a, respectively. The joist tube 41 telescopes within the joist tube 40, and its re-entrant corner has a greater transverse dimension than the re-entrant corner 42 so as to divide the upper compartment of the joist structure into three ducts of substantially equal dimension.

The outer ends of the major joist tubes 38 of the end joist structures 33 and the outer ends of the intermediate joist tubes 40 and 41 are provided with outer or bottom rollers 44 which support the next smallest joist member. The inner ends of the two joist tubes 40 and 41 and corresponding minor joist tube 39 is provided with top rollers 45 which engage the next largest joist member.

The bottom roller 44 of the intermediate joist tube 40 may be supported by a stirrup 46 embracing the sides and bottom of the outer end of the joist tube. The stirrup 46 is adapted to be joined through a separable connecting means 47 to a dolly wheel 48 adapted to ride on an underlying surface for the purpose of supporting the end joist structure when the trailer is extended. The dolly wheel assembly may be provided with a screw adjustment 49 so that the end joist structure is supported at the proper level.

The upwardly facing walls 42a and 43a of the ducts defined by the re-entrant corners 42 and 43 and a portion of the upwardly facing wall 39a the minor joist tubes 39 are adapted to carry floor supporting units 50a. Each floor supporting unit 50a includes a base channel 50 having end fittings 51 at its extremities connected therewith by journal pins 52. Torsion springs 53 surrounding one or more o fthe journal pins 52 tend to rotate the end fittings 51 to vertical positions, as shown in FIGURE 10.

The lower end fittings 51 are joined by means of adjustment screws 54 to upper end fittings 55 which in turn are connected by journal pins 56 to a top channel 57. The journal pins 52 and 56 define the corners of a parallelogram, and the transverse dimensions of the channel members are such that the floor supporting units may move between a solid position in which the top channel 57 nestles within the bottom channel 50, as indicated by dotted lines in FIGURE 10, and an upright position in which the top channel 57 is vertical above the bottom channel 50, as shown by solid lines in FIGURE 10.

In its folded position each floor supporting unit is capable of entering a corresponding duct, and is deflected from the solid line or floor supporting position shown in FIGURE 10 to its dotted line position by means of a guard 58 which engages the end of the next largest joist tube. The torsion springs 53 cause the floor supporting units to move automatically to their floor supporting positions when the joist structure is extended.

The outer or extended ends of the major joist tubes of the end joist structures and the intermediate joist tubes 40 and 41 are provided with outer pulleys 59. The inner ends of the intermediate joist tubes 40 and 41 and the corresponding minor joist tube 39 are provided with inner pulleys 60. An extension cable 61 is threaded alternately around the inner and outer pulleys. Idler pulleys 62 are utilized to guide the cable 61 clear of the floor supporting units. One extremity of the extension cable 61 is connected to an anchor 63 secured to a minor joist tube of each end joist structure.

A retraction cable 64 passes around pulleys 65 secured to the extremity of the minor joist tube 39 and terminates at the anchor 63. The extension and retraction cables are connected to a suitable drum so that one cable may be played out when the other cable is drawn in. The cable arrangement and its control is more fully described in the aforementioned Ferrera Patents 2,898,143 and 2,898,144.

The medial joist structures 34 are modifications of the end joist structures 33, in that in place of the intermediate joist tubes 40 and 41 three intermediate joist tubes 66, 67, and 68 are utilized. Each intermediate joist tube 66 is rectangular and fits slidably within the corresponding major joist tube 38. The intermediate joist tubes have similar re-entrant corners 69 having upwardly facing walls 69a.

Each intermediate joist tube 67 telescopes within a corresponding joist tube 66, whereas each intermediate joist tube 68 telescopes within a corresponding joist tube 67. In this construction, the joist tubes divide the upper compartment of each joist structure 34 into two ducts so that the corresponding minor joist tube 39 forms the lower wall of one duct and the corresponding intermediate tube 67 forms the lower wall of the other duct.

The walls of these ducts support floor supporting units comprising the base channel 50, top channel 57, and associated parts in the manner of the end joist structures 33. The outer extremity of each intermediate joist tube 67 carries a vertically adjustable post 70 which supports the central or movable floor strip 11. The inner ends of the joist tubes 66, 67, and 68 and the corresponding major joist tubes 38 are interconnected by a travel-limiting cable 71 attached to each of the joist tubes by anchor pins 72.

Figure 2:
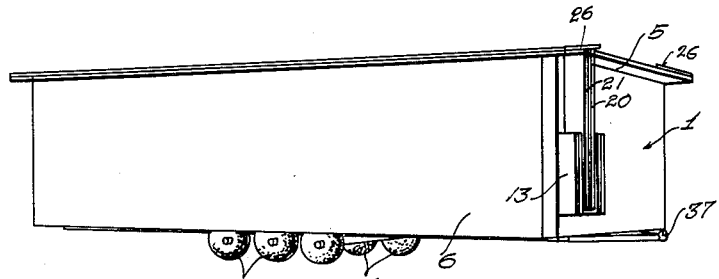
FIGURE 2 is a similar perspective view showing the trailer in its retracted position.
Figure 3:
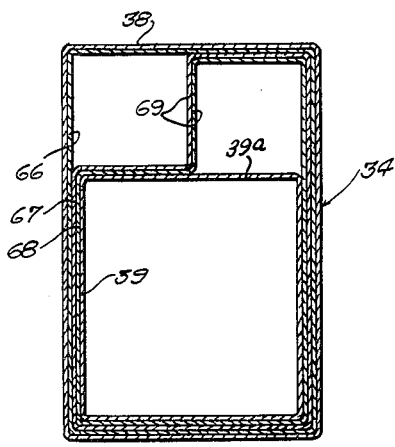
FIGURE 3 is an enlarged, transverse, sectional view of one of the intermediate extensible joist structures taken through 3—3 of FIGURE 7, showing the telescoping members but omitting associated elements.
Figure 4:
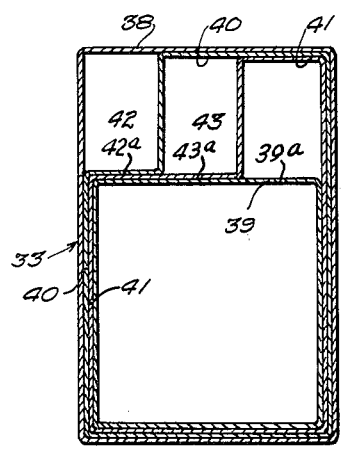
FIGURE 4 is a similar enlarged, transverse, sectional view of an end joist structure taken through 4—4 of FIGURE 11, also showing only the telescoping members.

Operation of the expansible trailer is as follows:

When the trailer is in its folded or mobile condition, as represented in FIGURES 2 and 6, the two pairs of floor panels 9, 10, 12, and 13 extend upwardly, and the pair of roof panels 20 and 21 extend downwardly with the lower ends of the roof panels between the two pairs of floor panels. The folded eaves 26 may overlie the fixed roof 5 and the marginal roof strip 8 respectively, so that the width of the trailer may be held to a minimum.

When it is desired to expand the trailer, the dolly wheels 48 are connected as shown in FIGURE 9. The cables 61 and 64 are then operated in the manner described in the aforementioned patents so as to force the end joist structures 33 outward. The outward movement of the side walls 6 draws the medial joist structures outward.

As the marginal strip 7 moves away from the fixed floor 2, the two pairs of floor panels tend to unfold equally so as to remain clear of the upwardly moving roof panels 20 and 21, as indicated by dash lines in FIGURE 5. As the clearance between the floor and roof panels increases with expansion of the trailer, it is not essential that the movable floor strip 11 remain exactly centered between the fixed floor 2 and marginal floor strips 7. However, under normal conditions the tubular joist members tend to move proportionately so that in effect the central floor strip moves approximately half the distance of the movable side wall.

When the movable side wall has reached its extended position, the floor panels readily move to their flat or extended position. The roof panels, however, tend to occupy a downwardly sloping condition, as indicated by broken lines in FIGURE 5, and thus tend to draw in the upper extremity of the side wall 6. It is therefore preferable, in order that the side wall may resist this force, that the side wall be reinforced by the end wall strips 29, and may have similar wall strips intermediate its ends. It should be noted, however, that it is impossible to construct freely sliding telescoping members which are not capable of a limited amount of flexure; consequently, the upper extremity of the wall 6 is capable of nominal displacement from the vertical so as to allow the roof sections "past center" between the broken line position and the solid line position.

The amount of displacement is quite small. For example, if the closed dimension of the trailer is assumed to be 10 feet and the inside ceiling height at the hinges 23 and 24 is 8 feet 6 inches, and the solid line position of the hinge 22 is 9 feet 6 inches, then it is only necessary that the upper end of the wall 6 displace approximately 1 inch. If the slope of the roof were less than illustrated, then the upper end of the wall would have a deflection of even less than 1 inch.

In order to minimize the force on the movable side wall, it is preferred to construct the roof panels in such a manner as to have minimum weight. By way of example, conventional "honeycomb" structures may be used. These structures involve thin and light weight surface sheets having honeycomb spacer elements therebetween. Another type of lightweight wall construction suitable as roof panels involves thin sheet members separated by rigid expanded or foamed plastic material.

When the trailer is expanded, the roof panels are forced upwardly from the broken line position to the solid line position shown in FIGURE 5, so as to form a peaked roof. The roof panels are held in this position by the removable beams 27 which are installed after the trailer is expanded. In practice the beams 27 may be utilized to force the roof panels to their final position. After installation of the beams 27 the rectangular space formed below the beams is closed by conventional fixed and sliding door units.

It will be observed that by reason of the fact that the floor panels and roof panels project beyond the end walls 4, the problem of forming a weathertight seal at the ends of the trailer is minimized. It will also be observed, particularly in FIGURES 5, 6, and 7, that the hinge 22 connecting the roof panels may be so arranged as to project above the roof when the trailer is expanded so as to ensure a seal. Also the upper surfaces of the roof panels may project over the fixed roof 5 and marginal roof strip 8 a short distance so as to facilitate a seal along the hinges 23 and 24.

It should be observed that the dolly wheels 48 are preferably not centered under the extending portion of the trailer so that the weight of the floor structure and side wall 6 beyond the dolly may counteract the tendency of the roof panels to draw in on the upper extremity of the side wall.

In order to retract the trailer, the door units 30 and 31 and beams 27 are removed and the roof panels 20 and 21 are allowed to assume the broken line position shown in FIGURE 5. The cables 61 and 64 are then operated to retract the movable side wall 6. In this connection, means of the type shown in the aforementioned patents is utilized for initiating the folding movement of the floor panels.

With the arrangement shown in FIGURES 1 through 17 the trailer may be arranged to expand more than twice its folded width. For example, the trailer may have a folded width of 10 feet and an expanded width of 26 feet or more, depending upon the vertical height between the floor and the roof.

Reference is now directed to FIGURE 18. In this construction, a second movable side wall and associated structure are substituted for the fixed side wall 3. As a consequence, both sides of the trailer may be expanded, making possible a trailer having a minimum width of 10 feet and a maximum width in the order of 45 feet.

While particular embodiments of this invention have been shown and described, it is not intended to limit the same to the exact details of the constructions set forth, and it embraces such changes, modifications, and equivalents of the parts and their formation and arrangement as come within the purview of the appended claims.

What is claimed is:

1. An expansible trailer, comprising: a fixed trailer section including a fixed floor, end walls, and a fixed roof projecting beyond said end walls to form fixed eaves; an upright side structure covering a side of said trailer between said end walls and movable laterally to and from said end walls; a pair of foldable roof panels hinged to each other, to said fixed roof, and to the top of said side structure, said roof panels projecting beyond the ends of said side structure and beyond said end walls to form foldable eaves; said roof panels movable between a vertically disposed depending position interposed between said end walls and side structure and a raised position, with the hinged connection between said roof panels disposed above the hinged connections with said fixed roof and side structure, and with said foldable eaves forming continuations of said fixed eaves; means for securing said roof panels in their raised position; upwardly foldable floor panels hinged to each other, to said fixed floor, and to said side structure, said floor panels having ends projecting beyond at least one end of said side structure and at least one of said end walls to form foldable porch members; said floor panels being movable between a vertically disposed upright position interposed between said end walls and side structure and a flat position with said porch members underlying said foldable eaves; and means for supporting said floor panels in their flat position.

2. An expansible trailer, comprising: a fixed trailer section including a fixed floor, end walls, and a fixed roof projecting beyond said end walls to form fixed eaves; an upright side structure covering a side of said trailer between said end walls and movable laterally to and from said end walls; a pair of foldable roof panels hinged to each other, to said fixed roof, and to the top of said side structure, said roof panels projecting beyond the ends of said side structure and beyond said end walls to form foldable eaves; said roof panels movable between a vertically disposed depending position interposed between said end walls and side structure and a raised position, with the hinged connection between said roof panels disposed above the hinged connections with said fixed roof and side structure, and with said foldable eaves forming continuations of said fixed eaves; means for securing said roof panels in their raised position two pairs of foldable floor panels adapted when folded to extend upwardly on opposite sides of said downwardly folded roof panels and when unfolded to occupy the plane of said fixed floor; a movable floor strip interposed between said pairs of floor panels under the hinged connection between said roof panels, the pairs of floor panels being hinged together, to said movable floor strip, to said fixed floor, and to said side wall structure; said movable floor strip and floor panels extending beyond at least one end of said side wall structure and the corresponding end wall and adapted, when said floor panels are in their unfolded condition, to form a porch structure extending from an end of said end wall; and means for supporting said foldable floor panels and floor strip.

3. An expansible trailer, comprising: a fixed trailer section including a fixed floor, fixed end walls, and a fixed roof projecting beyond said end walls to form fixed eaves; an upright side structure covering a side of said trailer between said end walls and movable laterally to and from said end walls; a pair of foldable roof panels hinged to each other, to said fixed roof, and to the top of said side structure, said roof panels projecting beyond the ends of said side structure and beyond said end walls to form foldable eaves; said roof panels moveable between a vertically disposed depending position interposed between said end walls and side structure and a raised position, with the hinged connection between said roof panels disposed above the hinged connections with said fixed roof and side structure, and with said foldable eaves forming continuations of said fixed eaves; upwardly foldable floor panels hinged to each other, to said fixed floor, and to said side structure, said floor panels having ends projecting beyond at least one end of said side structure and at least one of said end walls to form foldable porch members; said floor panels being movable between a vertically disposed upright position interposed between said end walls and side structure and a flat position with said porch members underlying said foldable eaves means for supporting said floor panels in their flat position; a removable beam for connecting said side wall structure and each of said end walls, when said side wall structure is extended from said end walls, said beams underlying and conforming to said roof panels when in their raised condition; and removable end wall panels extending from each of said end walls to said side wall structure.

4. An expansible trailer, comprising: a fixed trailer section including a fixed floor, end walls, and a fixed roof projecting beyond said end walls to form fixed eaves; an upright side structure covering a side of said trailer between said end walls and movable laterally to and from said end walls; roof panels connected to said fixed roof and to the top of said side wall structure, movable between a depending folded condition and a raised condition above the height of the connections of said roof panels with said fixed roof and wall structure wherein said roof panels form a peaked roof, said roof panels extending beyond said end walls to form eaves; floor panels connected to said fixed floor and said side wall structure and movable between an upstanding condition and a lowered condition wherein said floor panels form an extension of said fixed floor, at least one end of said floor panels projecting beyond a corresponding end wall to form a porch platform; means for supporting said roof panels in their peaked condition; and means for supporting said floor panels in their lowered condition.

5. An expansible trailer, comprising: a fixed trailer section including a fixed floor, end walls, and a fixed roof projecting beyond said end walls to form fixed eaves; an upstanding side structure covering a side of said trailer between said end walls and movable laterally to and from said end walls; roof panels connected to said fixed roof and said side wall structure, movable between a depending folded condition and to the upper end of a raised condition above the height of the connections of said roof panels with said fixed roof and wall structure wherein said roof panels form a peaked roof, said roof panels extending beyond said end walls to form eaves; floor panels connected to said fixed floor and said side wall structure and movable between an upstanding condition and a lowered condition wherein said floor panels form an extension of said fixed floor, at least one end of said floor panels projecting beyond a corresponding end wall to form a porch platform; a removable beam for connecting said side wall structure and each of said end walls, when said side wall structure is extended from said end walls, said beams underlying and conforming to said roof panels when in their raised condition; removable end wall panels extending between said floor panels and said beams, and between the ends of said side wall structure and said fixed end walls, means for supporting said roof panels in their peaked condition; and means for supporting said floor panels in their lowered condition.

6. An expansible trailer, comprising: a fixed trailer section including a fixed floor; a plurality of telescopic beams disposed under said fixed floor and movable between a retracted position and an extended position relative to said fixed floor, each of said telescopic beams including and end beam element and an intermediate beam element; a side wall structure connected to said end beam elements; a movable floor strip carried by said intermediate beam elements; means for effecting extension and retraction of said telescopic beams; means limiting movement of said intermediate beam elements to approximately one-half the distance of movement of said side wall structure, thereby to position said movable floor strip substantially midway between said side wall structure and said fixed floor, when said side wall structure is extended; a first pair of upwardly foldable floor panels disposed between said movable floor strip and said fixed floor, said first pair of floor panels being hinged to each other, to said floor strip, and to said fixed floor; and a second pair of upwardly foldable floor panels disposed between said floor strip and said side wall structure, said second pair of floor panels being hinged to each other, to said floor strip, and to said side wall structure.

7. An expansible trailer, comprising: a fixed trailer section including a fixed floor and a fixed roof; a plurality of telescopic beams disposed under said fixed floor and movable between a retracted position and an extended position relative to said fixed floor, each of said telescopic beams including and end beam element and an intermediate beam element; a side wall structure connected to said end beam elements; a movable floor strip carried by said intermediate beam elements; means for effecting extension and retraction of said telescopic beams; means limiting movement of said intermediate beam elements to approximately one-half the distance of movement of said side wall structure, thereby to position said movable floor strip substantially midway between said side wall structure and said fixed floor, when said side wall structure is extended; a first pair of upwardly foldable floor panels disposed between said movable floor strip and said fixed floor, said first pair of floor panels being hinged to each other, to said floor strip, and to said fixed floor; and a second pair of upwardly foldable floor panels disposed between said floor strip and said side wall structure, said second pair of floor panels being hinged to each other, to said floor strip, and to said side wall structure; and a pair of foldable roof panels hinged to each other, to said fixed roof, and to said side wall structure, said roof panels being movable between a depending folded position, with their hinged connection disposed adjacent said movable floor strip, and between said first and second pairs of floor panels and a raised position.

8. An expansible trailer, comprising: a plurality of extensible structures, each extensible structure including a major tube of rectangular cross section and a series of telescoping tubes of rectangular cross section, certain of said telescoping tubes having re-entrant corners at their upper sides thereby to form, when retracted, a plurality of separated ducts and to form when extended upwardly exposed walls, and floor supporting units carried by said walls, said units being pivotable between a folded condition fitting said ducts and an upwardly extended condition for supporting a floor thereabove; a fixed trailer section having a fixed floor and said major tubes being fixed thereunder whereby said telescoping tubes extend laterally from said fixed floor; a movable side wall structure connected with said extensible structures for movement to and from said fixed trailer section; and foldable floor panels disposed between said fixed floor and said side wall structure adapted, when said telescoping tubes are extended, to rest on said floor supporting units.

9. An expansible trailer, comprising: a plurality of extensible structures, each extensible structure including a major tube of rectangular cross section and a series of telescoping tubes of rectangular cross section, certain of said telescoping tubes having re-entrant corners at their upper sides thereby to form, when retracted, a plurality of separated ducts and to form when extended upwardly exposed walls, and floor supporting units carried by said walls, said units being pivotable between a folded condition fitting said ducts and an upwardly extended condition for supporting a floor thereabove; a fixed trailer section having a fixed floor and said major tubes being fixed thereunder whereby said telescoping tubes extend laterally from said fixed floor; a movable side wall structure connected with said extensible structures for movement to and from said fixed trailer section; a movable floor strip supported by intermediate tubes of said series of extensible tubes; a first pair of foldable floor panels interposed between said fixed floor and said floor strip; and a second pair of foldable floor panels interposed between said floor strip and said side wall structure.

10. An expansible trailer, comprising: a plurality of extensible structures, each extensible structure including a major and minor tube, both of rectangular cross section, and at least one intermediate tube, the intermediate tube having a re-entrant upper corner, said intermediate and minor tubes adapted to telescope into said major tube, the minor tube dimensioned to fit under said re-entrant corner whereby when said tubes are telescoped said tubes define at least two ducts, the lower walls of which are formed by said re-entrant corner and the upper side of said minor tube respectively, said walls forming, when said tubes are extended, upwardly exposed supporting surfaces; a plurality of upwardly extensible floor supporting units pivotably mounted on said supporting surfaces, said units being foldable to enter said ducts; a fixed trailer section having a fixed floor and said major tubes being fixed thereunder whereby said intermediate and minor tubes extend laterally from said fixed floor; a movable side wall structure connected with said minor tubes for movement to and from said fixed trailer section; and foldable floor panels disposed between said fixed floor and said side wall structure adapted, when said telescoping tubes are extended, to rest on said floor supporting brackets.

11. An expansible trailer, comprising: a plurality of extensible structures, each extensible structure including a major and a minor tube, both of rectangular cross section, and at least one intermediate tube, the intermediate tube having a re-entrant upper corner, said intermediate and minor tubes adapted to telescope into said major tube, the minor tube dimensioned to fit under said re-entrant corner whereby when said tubes are telescoped said tubes define at least two ducts, the lower walls of which are formed by said re-entrant corner and the upper side of said minor tube respectively, said walls forming, when said tubes are extended, upwardly exposed supporting surfaces; a plurality of upwardly extensible floor supporting units pivotably mounted on said supporting surfaces, said units being foldable to enter said ducts; a fixed trailer section having a fixed floor and said major tubes being fixed thereunder whereby said intermediate and minor tubes extend laterally from said fixed floor; a movable side wall structure connected with said minor tubes for movement to and from said fixed trailer section; a movable floor strip supported by said intermediate tubes; a first pair of foldable floor panels interposed between said fixed floor and said floor strip; and a second pair of foldable floor panels interposed between said floor strip and said side wall structure.

12. In an expansible trailer having a fixed section including a floor and a movable side wall structure, means for extending and retracting said side wall structure, comprising: a major tube fixed under each end of said fixed section; a minor tube adapted to fit within said major tube, said tubes being rectangular in cross section and said minor tube being dimensioned to divide said major tube into upper and lower compartments; a series of intermediate tubes dimensioned to fit one within the other, the larger fitting within said major tube and the smaller receiving said minor tube; said intermediate tubes having re-entrant upper corners proportioned to divide said upper compartment transversely into a series of ducts; pulleys at the extremities of said ducts; and an extension cable threaded through said pulleys to urge said intermediate and minor tubes toward extended positions.

13. An expansible trailer, comprising: a fixed trailer section having a fixed roof and a fixed floor; at least one horizontally movable side wall structure; relatively distal floor panels hinged to said side wall structure and fixed floor, respectively; relatively proximal floor panels hinged to said distal floor panels; a movable floor strip interposed between said proximal floor panels and hinged thereto; said distal and proximal floor panels being upwardly foldable at opposite sides of said floor strip; and a pair of foldable roof panels hinged together, to said fixed roof and to said side wall structure, and dimensioned to depend and interleave, when folded, between said pairs of upwardly foldable floor panels.

14. An expansible trailer, comprising: a fixed trailer section having a fixed roof and a fixed floor; at least one horizontal movable side wall structure; relatively distal floor panels hinged to said side wall structure and fixed floor, respectively; relatively proximal floor panels hinged to said distal floor panels; a horizontally movable floor strip interposed between said floor panels and hinged thereto; said distal and proximal floor panels being upwardly foldable at opposite sides of said floor strip; a pair of downwardly foldable roof panels hinged together, to said fixed roof and to said wall structure, said roof panels being dimensioned to depend and interleave, when folded, between said pairs of upwardly foldable floor panels; means for moving said wall structure in a horizontal direction to and from said fixed trailer section; and means for moving said floor strip in a horizontal direction approximately one-half the distance of said wall, to locate said floor strip under the hinged connection between said pair of roof panels.

References Cited by the Examiner

UNITED STATES PATENTS

| | | | |
|---|---|---|---|
| 2,127,580 | 8/1938 | Bartholowsky | 296—26 |
| 2,152,713 | 4/1939 | Stewart | 296—23 |
| 2,670,986 | 3/1954 | Presnell | 52—70 X |
| 2,732,251 | 1/1956 | Meaker | 296—23 |
| 2,790,673 | 4/1957 | Zur Nieden | 296—23 |
| 2,842,972 | 7/1958 | Houdart | 296—26 |
| 2,886,856 | 5/1959 | Che | 52—69 |
| 2,898,144 | 8/1959 | Ferrera | 52—67 X |
| 2,965,412 | 12/1960 | Henderson et al. | 52—67 X |
| 3,070,850 | 1/1963 | McClure | 52—69 |

RICHARD W. COOKE, JR., *Primary Examiner.*

JACOB L. NACKENOFF, HENRY C. SUTHERLAND, *Examiners.*